US009766356B2

(12) United States Patent
Thornton

(10) Patent No.: US 9,766,356 B2
(45) Date of Patent: Sep. 19, 2017

(54) METHOD FOR COMPUTING UNCERTAINTIES IN PARAMETERS ESTIMATED FROM BEAMFORMED MICROSEISMIC SURVEY DATA

(71) Applicant: Microseismic, Inc., Houston, TX (US)

(72) Inventor: Michael P. Thornton, Houston, TX (US)

(73) Assignee: Microseismic, Inc., Houston, TX (US)

( * ) Notice: Subject to any disclaimer, the term of this patent is extended or adjusted under 35 U.S.C. 154(b) by 617 days.

(21) Appl. No.: 14/219,388

(22) Filed: Mar. 19, 2014

(65) Prior Publication Data

US 2014/0288835 A1     Sep. 25, 2014

Related U.S. Application Data

(60) Provisional application No. 61/803,813, filed on Mar. 21, 2013.

(51) Int. Cl.
*G01V 1/28* (2006.01)
*G01V 1/40* (2006.01)

(52) U.S. Cl.
CPC ............ *G01V 1/288* (2013.01); *G01V 1/40* (2013.01); *G01V 2210/667* (2013.01)

(58) Field of Classification Search
CPC .... G01V 1/288; G01V 2210/667; G01V 1/40; G01V 1/307; G01V 2210/123

(Continued)

(56) References Cited

U.S. PATENT DOCUMENTS 7,647,183 B2 * 1/2010 Jechumtalova ........ G01V 1/008 702/14
7,978,563 B2 * 7/2011 Thornton ............... G01V 1/288 367/38

(Continued)

FOREIGN PATENT DOCUMENTS

EP      0060029 A2    9/1982
EP      0060029 B1 *  9/1986  .............. G01H 5/00

OTHER PUBLICATIONS

International Search Report and Written Opinion, International Application No. PCT/US2014/031200.

*Primary Examiner* — Carol S Tsai
(74) *Attorney, Agent, or Firm* — Richard A. Fagin

(57) ABSTRACT

A method for estimating uncertainties in determining hypocenters of seismic events occurring in subsurface formations according to one aspect includes determining estimates of event locations by choosing local peaks in summed amplitude of seismic energy detected by an array of sensors disposed above an area of the subsurface to be evaluated. For each peak, the following is performed: recomputing the summed amplitude response for a selected set of points of comprising small perturbations in time and space from the estimated event locations; computing second derivatives of log likelihood function from the stacked responses at the estimated location and the perturbed locations; assembling the second derivatives into a Fisher information matrix; computing an inverse of the Fisher information matrix; determining variances of estimated parameters from the elements from the diagonal of the inverted matrix; and computing standard deviations of the estimated parameters by calculating a square root of the variances.

14 Claims, 18 Drawing Sheets

(58) Field of Classification Search
USPC .......... 702/6, 14; 367/33, 38, 24, 25, 73, 21
See application file for complete search history.

(56) References Cited

U.S. PATENT DOCUMENTS

| | | | | |
|---|---|---|---|---|
| 8,463,547 | B2* | 6/2013 | Bakulin | G01V 1/364 |
| | | | | 702/6 |
| 9,182,509 | B2* | 11/2015 | Taherian | G01V 1/282 |
| 2008/0068928 | A1* | 3/2008 | Duncan | G01V 1/288 |
| | | | | 367/73 |
| 2009/0048783 | A1* | 2/2009 | Jechumtalova | G01V 1/008 |
| | | | | 702/11 |
| 2010/0097886 | A1* | 4/2010 | Day | G01V 1/364 |
| | | | | 367/24 |
| 2011/0044131 | A1* | 2/2011 | Thornton | G01V 1/288 |
| | | | | 367/38 |
| 2011/0130967 | A1* | 6/2011 | Bakulin | G01V 1/364 |
| | | | | 702/16 |
| 2011/0305110 | A1* | 12/2011 | Taherian | G01V 1/282 |
| | | | | 367/33 |
| 2013/0215716 | A1* | 8/2013 | Hofland | G01V 1/306 |
| | | | | 367/38 |

* cited by examiner

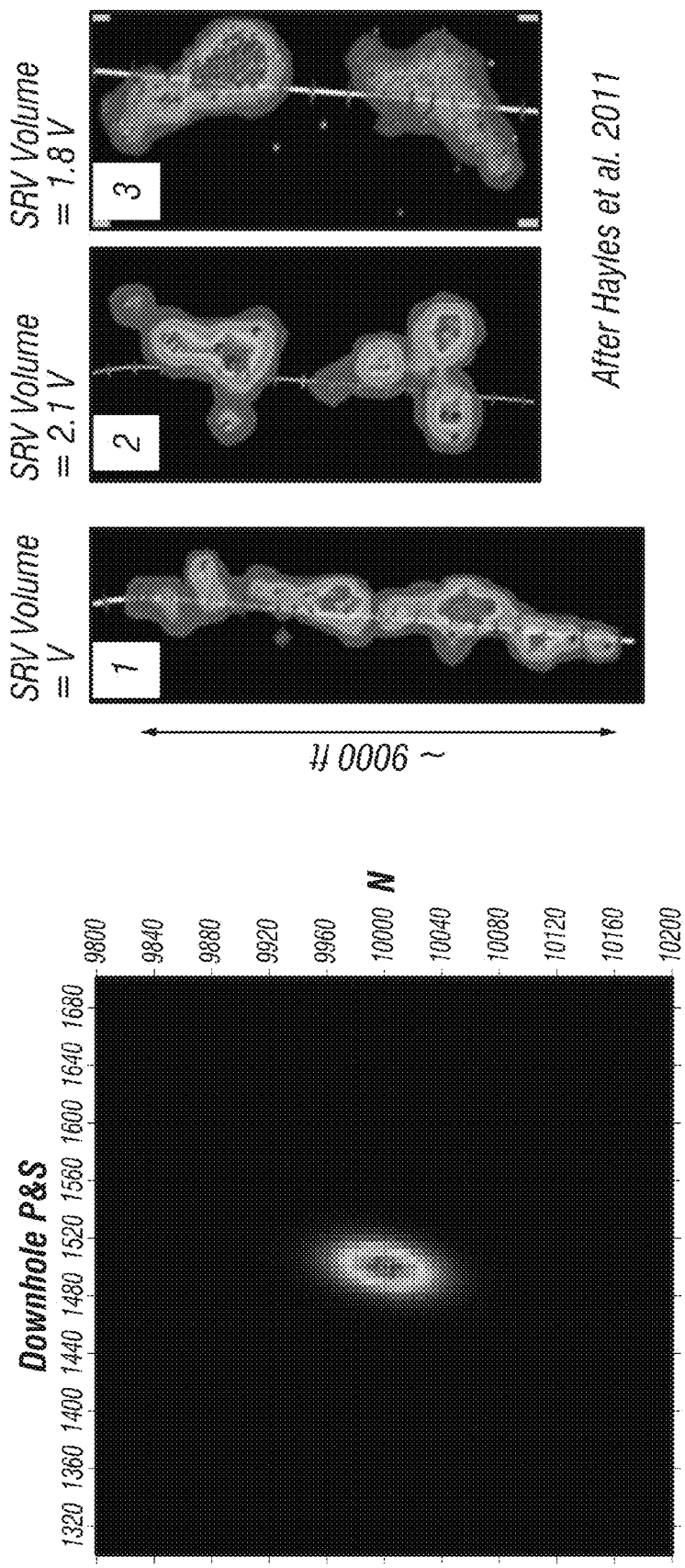

METHOD FOR COMPUTING UNCERTAINTIES IN PARAMETERS ESTIMATED FROM BEAMFORMED MICROSEISMIC SURVEY DATA

CROSS-REFERENCE TO RELATED APPLICATIONS

Priority is claimed from U.S. Provisional Application No. 61/803,813 filed Mar. 21, 2013.

STATEMENT REGARDING FEDERALLY SPONSORED RESEARCH OR DEVELOPMENT

Not applicable.

BACKGROUND

This disclosure relates generally to the field of determining time and position of origin of seismic events occurring in the subsurface. More particularly, the disclosure relates to techniques for determining uncertainty in the determined positions and times of origin of such seismic events.

In passive seismic surveying, sensors (e.g., geophones) are deployed to record seismic response at various locations. A set of possible subsurface seismic event (source) locations are defined, in one example case a 3D grid of points presumably encompassing all event location. For each point in this set, for a travel time from presumed source location to each sensor, the recorded data from each sensor is time shifted to remove the travel time delay, then the time shifted responses from all sensors are summed. For a given time span, local peaks in the summed response are determined among the set of possible source locations. The locations and timing of these peaks are taken as estimates of the location and origin time of the seismic events. An example technique for determining estimated time of origin and position of the seismic events is described in U.S. Pat. No. 7,663,970 issued to Duncan et al. and incorporated herein by reference in its entirety.

One problem in microseismic data analysis is to estimate some set of parameters of interest from data collected during an experiment. A maximum-likelihood estimator is a mathematical process that produces an estimate of a set of model parameters by finding the maximum probability (likelihood) of given data. The likelihood function is constructed from a statistical description of the noises present in the data, a mathematical model of the data generation process and the data. Once this likelihood function is specified, an estimate of the parameters may be obtained by application of an appropriate optimization strategy, to determine the values of the parameters that maximize the likelihood.

Using concepts from estimation theory it is possible to compute estimates of the uncertainty in the estimates obtained from a maximum likelihood estimator. An estimate of the uncertainty can be obtained following a process known as the "Cramer-Rao lower-bound". Here the variance of the estimator (Var($\hat{\xi}$)) can be shown to be bounded below by the values given by elements of the inverse of the Fisher Information Matrix (F).

$\hat{\xi}$=MLE of parameters $$Var(\hat{\xi}_i) \geq [F_{ii}]^{-1}$$

The Fisher information matrix is computed from second derivatives of the natural log of the likelihood function:

$$F_{ij} = -\frac{\partial^2 \mathcal{L}(\xi)}{\partial \xi_i \partial \xi_j}$$

$$\mathcal{L}(\xi) = \ln(\text{likelihood}(\xi | \text{data}))$$

SUMMARY

A method for estimating uncertainties in determining hypocenters of seismic events occurring in subsurface formations according to one aspect includes determining estimates of event locations by choosing local peaks in summed amplitude of seismic energy detected by an array of sensors disposed above an area of the subsurface to be evaluated. For each peak, the following may be performed:

a) recomputing the summed amplitude response for a selected set of points of comprising small perturbations in time and space from the estimated event locations;

b) computing second derivatives of log-likelihood function from the stacked responses at the estimated location and the perturbed locations;

c) assembling the second derivatives into a Fisher information matrix;

d) computing an inverse of the Fisher information matrix;

e) determining variances of estimated parameters from the elements from the diagonal of the inverted matrix; and f) computing standard deviations of the estimated parameters by calculating a square root of the variances (a/k/a standard deviation).

Other aspects and advantages will be apparent from the description and claims that follow.

BRIEF DESCRIPTION OF THE DRAWINGS

FIGS. 7A and 7B show, respectively, downhole location uncertainties.

DETAILED DESCRIPTION

Passive seismic data may be acquired as described in the Duncan et al. patent referred to in the Background section herein and as will be explained with the example arrangement shown in FIG. 1.

Figure 1:
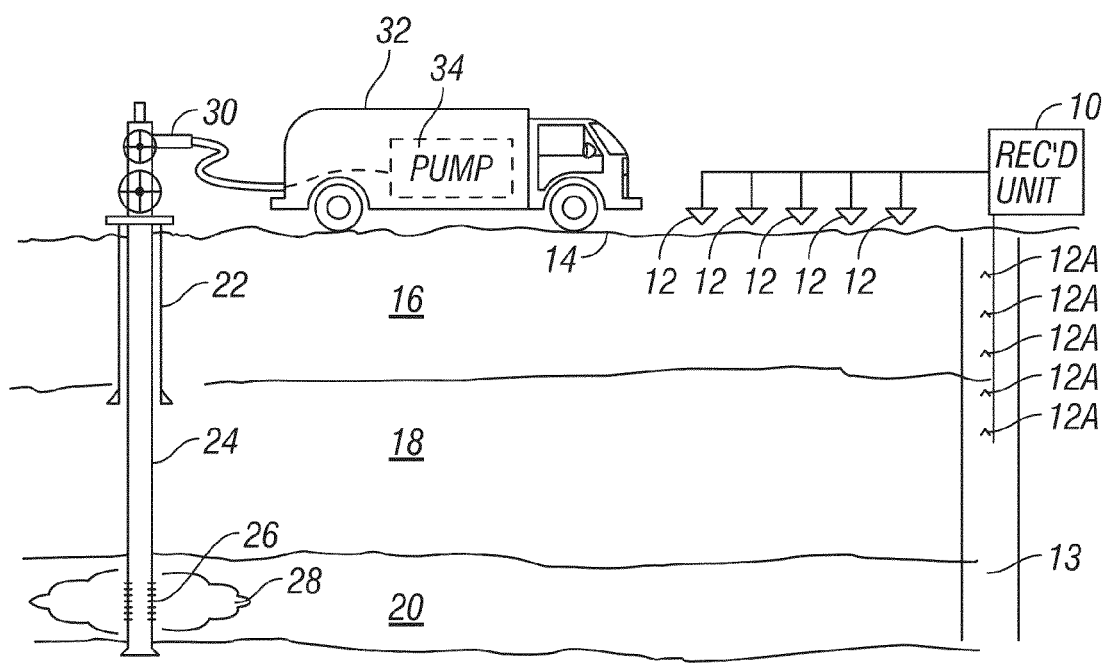
FIG. 1 shows an example of acquisition of seismic data from seismic events occurring in the subsurface.

FIG. 1 shows an array of seismic sensors 12 arranged proximate to the Earth's surface 14 to detect seismic energy originating from within one or more the subsurface formations 16, 18, 20. In marine applications, the array of seismic sensors 12 could be arranged at or proximate to the water bottom in a cable-based device known as an "ocean bottom cable." The seismic sensors 12 detect seismic energy created, for example, by hydraulic fracturing of the hydrocarbon producing formation 20. The seismic energy may also result from other seismic events occurring within the Earth's subsurface, for example, microearthquakes.

In some examples, the seismic sensors 12 may be arranged in sub-groups, with spacing between individual sensors in each of the subgroups being less than about one-half the expected wavelength of seismic energy from the Earth's subsurface that is intended to be detected. Signals from all the seismic sensors 12 in one or more of the sub-groups may be added or summed to reduce the effects of noise in the detected signals. The seismic sensors 12 generate electrical or optical signals in response to particle motion, velocity or acceleration. A recording unit 10 is in signal communication with the seismic sensors 12 for making a time-indexed recording of the seismic signals detected by each seismic sensors 12. In some examples the seismic sensors 12 are geophones. In other examples, the seismic sensors 12 may be accelerometers or other sensing devices known in the art that are responsive to motion, velocity or acceleration, of the formations proximate to the particular sensor. Some types of seismic sensors may include a plurality of mutually orthogonally arranged particle motion responsive sensing elements to detect particle motion along different directions, e.g., shear waves. Accordingly, the type of seismic sensor is not a limit on the scope of the present invention.

In one example, the seismic sensors 12 may be arranged in a radially extending, spoke like pattern, with the center of the pattern disposed approximately about the surface position of a wellbore 22. Alternatively, if the geodetic position of the formations at which the fluid enters from the wellbore is different than the surface geodetic position of the wellbore 22, the sensor pattern may be centered about such geodetic position. Such sensor pattern is used, for example, in fracture monitoring services provided under the service mark FRACSTAR, which is a service mark of Microseismic, Inc., Houston, Tex., also the assignee of the present invention. Examples of arrangements of the seismic sensor pattern are shown in perspective view in FIG. 3, and in plan view in FIG. 4 along a plurality of lines L1 through L8.

The wellbore 22 is shown drilled through various subsurface Earth formations 16, 18, through a hydrocarbon producing formation 20. A wellbore tubing 24 having perforations 26 formed therein corresponding to the depth of the hydrocarbon producing formation 20 is connected to a valve set known as a wellhead 30 disposed at the Earth's surface. The wellhead may be hydraulically connected to a pump 34 in a frac pumping unit 32. The frac pumping unit 32 is used in the process of pumping a fluid, which in some instances includes selected size solid particles, collectively called "proppant", are disposed, Pumping such fluid, whether propped or otherwise, is known as hydraulic fracturing. The movement of the fluid is shown schematically at the fluid front 28 in FIG. 1. In hydraulic fracturing techniques known in the art, the fluid is pumped at a pressure which exceeds the fracture pressure of the particular producing formation 20, causing it to rupture, and form fissures therein. The fracture pressure is generally related to the pressure exerted by the weight of all the formations 16, 18 disposed above the hydrocarbon producing formation 20, and such pressure is generally referred to as the "overburden pressure." in propped fracturing operations, the particles of the proppant move into such fissures and remain therein after the fluid pressure is reduced below the fracture pressure of the formation 20. The proppant, by appropriate selection of particle size distribution and shape, forms a high permeability channel in the formation 20 that may extend a great lateral distance away from the tubing 24, and such channel remains permeable after the fluid pressure is relieved. The effect of the proppant filled channel is to increase the effective radius of the wellbore 24 that is in hydraulic communication with the producing formation 20, thus substantially increasing productive capacity of the wellbore 24 to hydrocarbons.

The fracturing of the formation 20 by the fluid pressure creates seismic energy that may be detected by the seismic sensors 12. The time at which the seismic energy is detected by each of the sensors 12 with respect to the time-dependent position in the subsurface of the formation fracture caused at the fluid front 28 is related to the acoustic velocity of each of the formations 16, 18, 20, and the position of each of the seismic sensors 12.

The foregoing example of arranging sensors in a selected pattern on the surface is only one example of an arrangement for acquiring seismic signals usable with methods according to the present disclosure it is also possible to one or more place seismic sensors 12A at selected depths in one or more wellbores 13 in the vicinity of the area of the Earth's subsurface to be evaluated using example methods as described herein. For example, one arrangement of sensors is described in U.S. Patent Application Publication No. 2011/024934 filed by Thornton et al. Other arrangements of seismic sensors will occur to those skilled in the art. For purposes of acquiring seismic signals for use with the present example methods, it is preferable that the seismic sensors be proximate the spatial position of the seismic events giving rise to the detected signals. Proximate in the present context may mean up to about 10 kilometers from the seismic events.

The recording unit 10 may include (not shown separately) a general purpose programmable computer or a dedicated program computer including data storage and display devices that may perform a process according to the present invention and store and/or display the results of the process. The type of computer used to implement the method and the type of display and/or storage devices are not limits on the scope of the present invention. An example computer system operable at multiple locations will be explained with reference to FIG. 25.

Although the foregoing example is described with reference to fracturing of subsurface formations, application of methods according to the present disclosure is not limited to such uses. Any subsurface seismic event may be analyzed according to example methods as described herein.

Figure 2A:
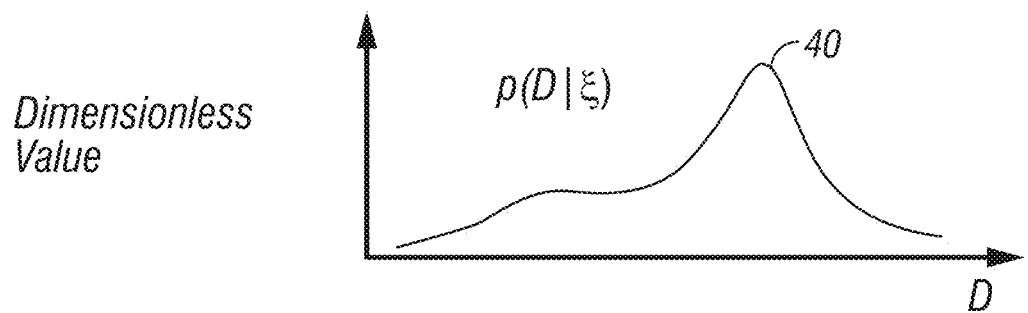
FIGS. 2A through 2C graphically illustrate Maximum Likelihood Estimation (MLE). The solution of the inverse problem is the model parameters (in this case, the location of a subsurface occurring seismic event) with maximum likelihood value.
Figure 2B:
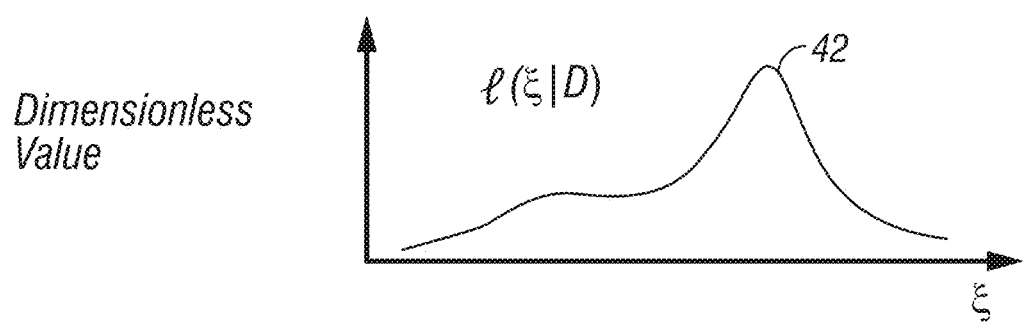

In an example embodiment, it can be shown that using certain assumptions, determining positions of seismic events occurring in the subsurface is a maximum-likelihood estimator. The log-likelihood function is proportional to the summed amplitude response. Referring to FIG. 2A, a graph of probability of occurrence, at curve 40 represents the following: p(D|ξ) is probability of measured data (D) (e.g., seismic amplitude with respect to time, given parameters (ξ), e.g., spatial position of the origin of seismic events and other parameters associated with such events, e.g., moment and/or moment magnitude. FIG. 2B shows, at curve 42, the likelihood of values of the parameters resulting in the values of the measured data:

l(ξ|D) is likelihood of parameters (ξ) given the data (D).

Figure 2C:
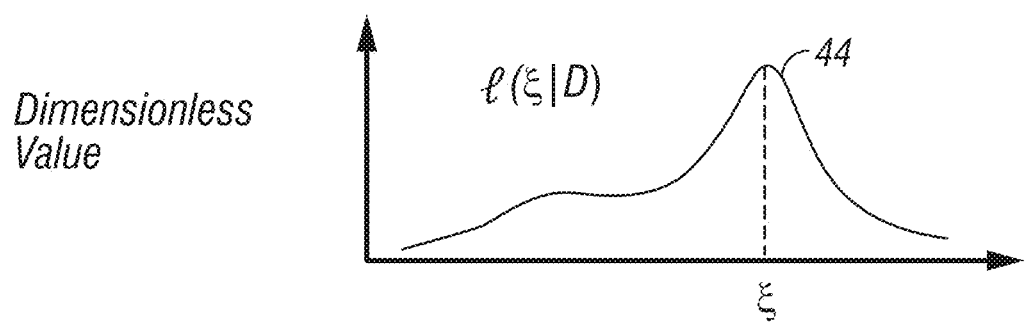

FIG. 2C shows at 42, estimating the parameters as a maximization of the likelihood:

$\hat{\xi}$=arg max l(ξ|D) is the maximum likelihood estimate (MLE)

that is, the parameter set which most likely causes the response of the volume of the Earth between the seismic event parameters and the measured data represent the most likely values of the seismic event parameters.

In the present example, one may assume that the parameters are normally distributed (i.e., have a Gaussian distribution):

$t_{pick} \sim N(t_{arr}, \sigma_t^2)$ wherein $t_{pick}$ represents summed arrival times of a seismic event at the sensors (12 in FIG. 1), N is the number of sensors, $t_{arr}$ represents the arrival time of a seismic event at each sensor and $\sigma_t^2$ represents the variance in the arrival times. Probability of an arrival at any one sensor may be defined by the expression:

$$p(t_{pick} | \xi) = Ce^{-\frac{(t_{pick} - t_{mod}(\xi))^2}{2\sigma_t^2}}$$

wherein C represents a normalizing constant, e represents base of the natural logarithm and $t_{mod}$ represents modelled or predicted traveltime between the seismic event source location and a seismic sensor. The parameter vector may be defined as:

ξ=$[x_s, y_s, z_s, t_0]'$ which is, as explained, the spatial position and origin time of each seismic event.

For the entire array of seismic sensors, the logarithm of the likelihood may be defined by the expression:

$$\mathcal{L}(\xi | t_{pick}) = -\frac{1}{2\sigma_t^2}[(t_{pick} - t_{mod}(\xi))'(t_{pick} - t_{mod}(\xi))] + C$$

Figure 3:
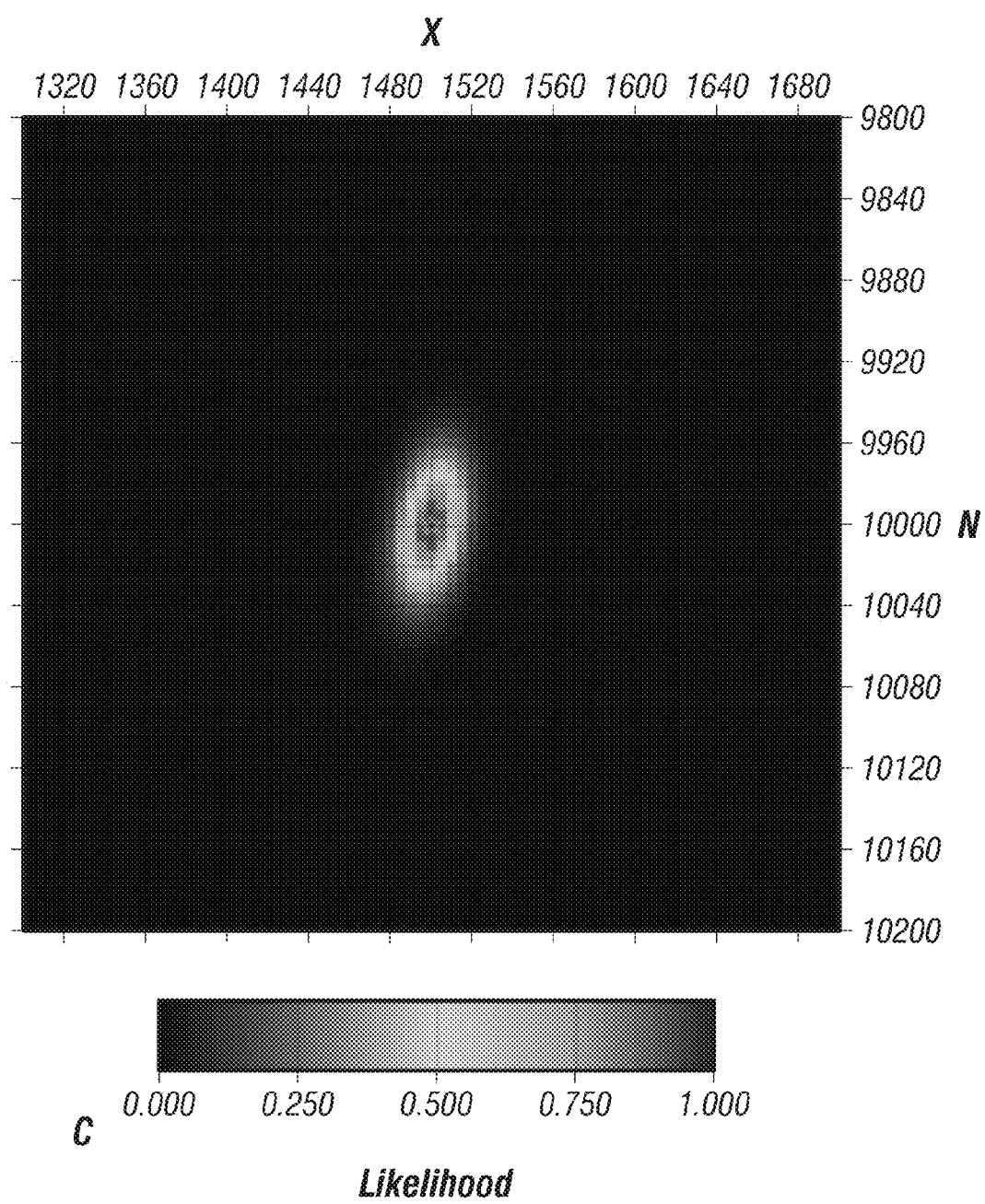
FIG. 3 shows an example of MLE event location from compressional and shear arrival picks. The maximum can be identified in the 2D graph.

Thus, one can compute the variances of the location estimates using the Cramer-Rao technique and the summed amplitude response as a log-likelihood function. FIG. 3 shows an example of using the above expression to determine likelihood of a detected seismic event displayed in a vertical plane (X, Z), wherein the maximum likelihood is visible as a bright spot (likelihood being represented by successively lighter shading) at the X,Z position of the most likely point of origin of a seismic event.

The present example may be performed using selected arrival times, or using beamforming techniques (wherein a summed response of the sensors or subsets thereof have a selected time delay added to the individual responses to maximize total response originating from a selected direction or point in the subsurface). For an array response:

X(r,t)=S(t)G(ξ,r,t)+N(t)

wherein the left hand term represents the response with respect to time at sensor (r), S represents the seismic event source function with respect to time, t, G represents Green's function and N represents noise. For the entire array of seismic sensors, a log likelihood response may be defined as:

$$\mathcal{L}(\xi | X) = -\frac{1}{2\sigma_n^2}[(X - SG(\xi))'(X - SG(\xi))] + C$$

Figure 4:
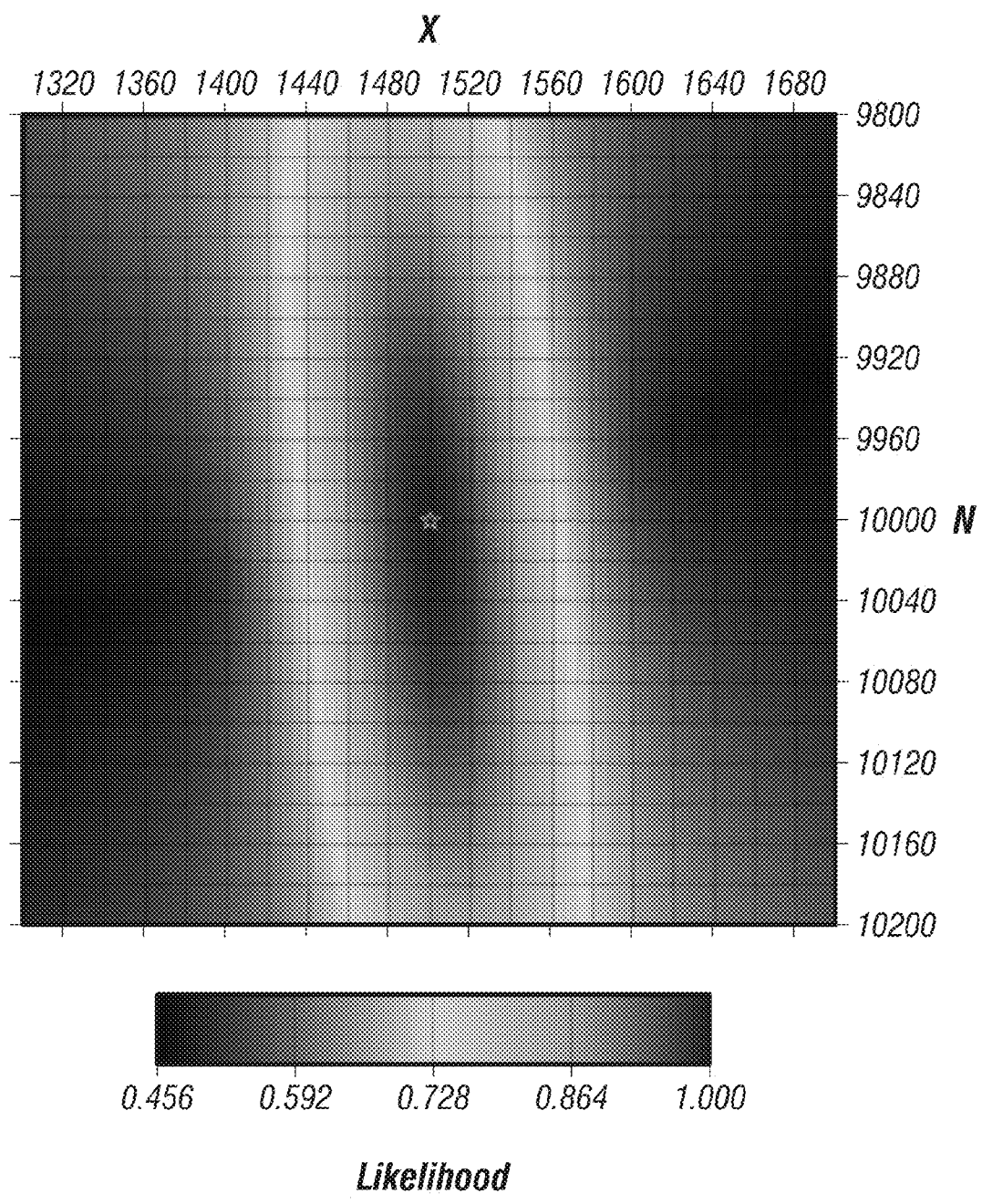
FIG. 4 shows an MLE example of event location from beamforming: The Log-Likelihood function may be calculated from the P-wave beamforming procedure using a surface receiver array. The maximum can be easily identified in the 2D graph.

An example beam formed response is shown in the X,Z plane in FIG. 4.

One may compare the response obtained using picked arrivals (i.e., events which exceed a selected amplitude threshold) for both compressional (P) and shear (S) wave arrivals from a seismic event at the sensors as follows:

$$\mathcal{L}(\xi | t_{pick}) = -\frac{1}{2\sigma_t^2}[(t_{pick} - t_{mod}(\xi))'(t_{pick} - t_{mod}(\xi))] + C$$

$$\hat{\xi} = \text{argmax}\mathcal{L}(\xi | t_{pick}) = \text{argmin}\sum \Delta t^2$$

The MLE solution may be a least-squares solution. For beamforming:

$$\mathcal{L}(\xi | X) = -\frac{1}{2\sigma_n^2}[(X - SG(\xi))'(X - SG(\xi))] + C$$

$$\mathcal{L}(\xi | X) = -\frac{SG(\xi)'X}{\sigma_n^2} + C$$

and $$\hat{\xi} = \text{argmax}\mathcal{L}(\xi | X)$$

In the above beamforming example, the NILE solution is provided by the parameter set which results in the peak stacked amplitude.

In order to calculate uncertainties, the following may be considered:

$\hat{\xi}$=arg max $\mathcal{L}(\xi|X) \pm \delta$

The Cramer Rao lower bound may be defined as:

$\text{Cov}(\xi_i) \geq F_{ii}^{-1}$

The Fisher information matrix may be defined as:

$$F_{ij} = -\frac{\partial^2}{\partial \xi_i \partial \xi_j} \mathcal{L}(\xi \mid D)$$

And standard errors may be determined by the expression:

$$std(\hat{\xi}_i) = \sqrt{F_{ii}^{-1}}$$

In the above expressions, one may compute the full matrix above of second partial derivatives. The matrix may be inverted and estimate of variances are taken from the diagonal of the inverted matrix.

It may be shown that fir picked arrivals, uncertainties are related to error is picking the correct arrival times of the events:

$$std(\hat{\xi}_i) = \sigma_t \sqrt{\left[-\frac{\partial^2}{\partial \xi_i \partial \xi_j} SSE(\xi)\right]^{-1}}$$

For beamforming, uncertainties are related to signal to noise ratio (SNR) as follows:

$$std(\hat{\xi}_i) = \frac{1}{SNR} \sqrt{\left[-\frac{\frac{\partial^2}{\partial \xi_i \partial \xi_j} G(\xi)'X}{|S|}\right]^{-1}}$$

Figure 5:
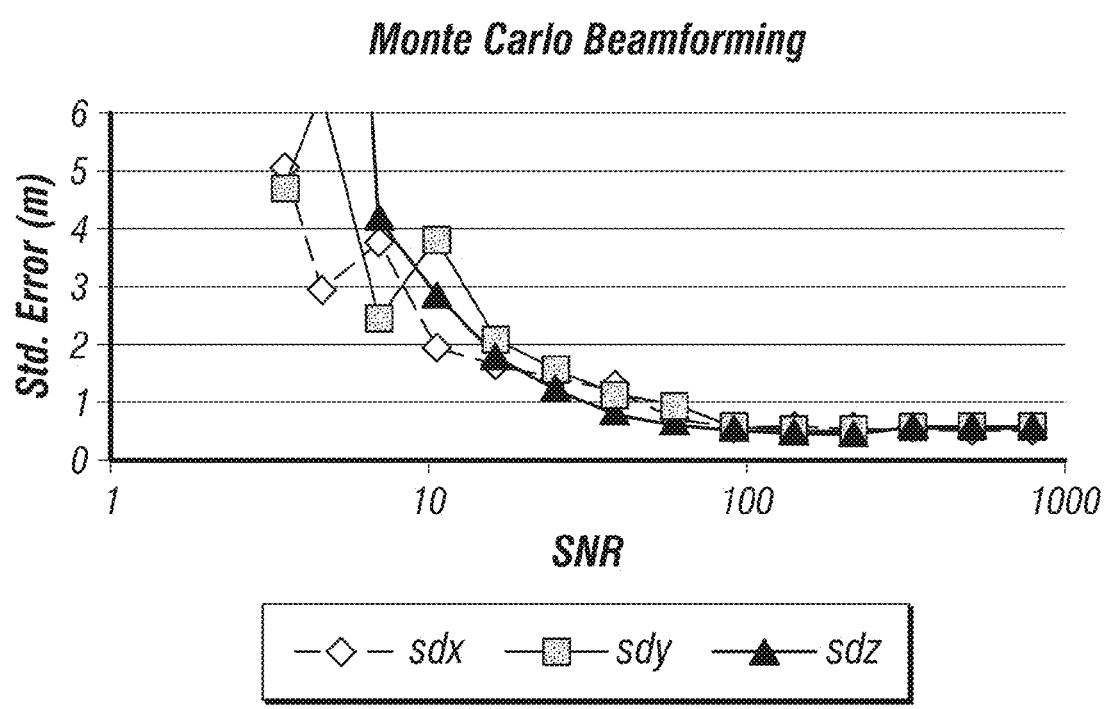
FIG. 5 shows a graphic comparison of the uncertainties from P&S picking and beamforming.

A graph of uncertainties in the X, Y and Z positions calculated using beamforming with respect to SNR is shown in FIG. 5.

Figures 6A, 6B:
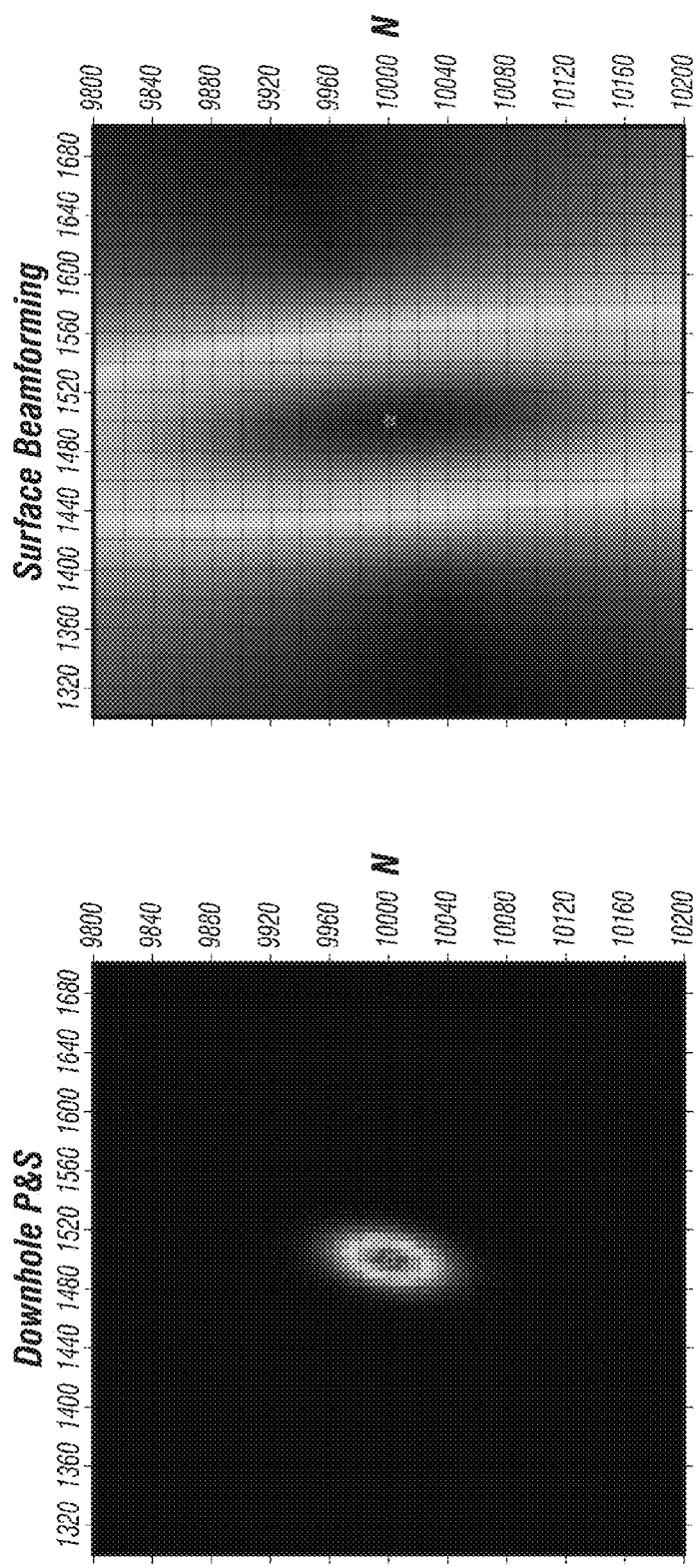
FIGS. 6A and 6B shows location uncertainties from downhole measurements (FIG. 6A) and surface beamforming (FIG. 6B).

FIGS. 6A and 6B show, respectively, uncertainties in event position location determination using arrival time picking and beamforming, respectively. FIGS. 7A and 7B show, respectively, a comparison of uncertainties in event location determination between arrival time picking (FIG. 7A) and using beamforming (FIG. 7B).

Uncertainties in velocity may be addressed as follows:

$l(\xi)=l(\xi|v)*p(v)$ represents adding velocity as a parameter to the likelihood function. The parameter vector may thus be modified to: $\xi=[x_s, y_s, z_s, t_0, v_p, v_s]'$. Velocity thus becomes another parameter to be estimated and have its standard errors determined as explained above with respect to position.

$$std(\hat{\xi}_i) = \sqrt{F_{ii}^{-1}}$$

Figure 8:
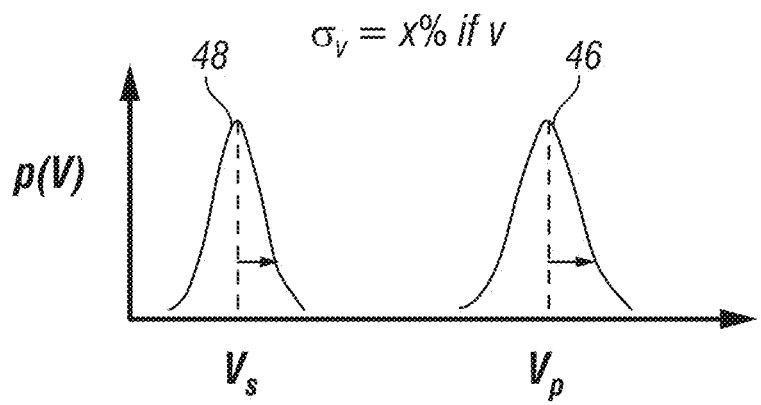
FIG. 8 shows a graphic example of accounting for velocity uncertainty.

The foregoing is shown in FIG. 8 with respect to P velocity uncertainty and S velocity uncertainty at curves 46 and 48, respectively. Note that Velocity uncertainty represents the range of possible velocities, not the velocity error. The velocity error may be determined as $\Delta v_{err} = \hat{v} - v_{true}$. Where $\hat{v}$ represents the estimated velocity, and $v_{true}$ represents the actual or true velocity of the earth.

Figure 9:
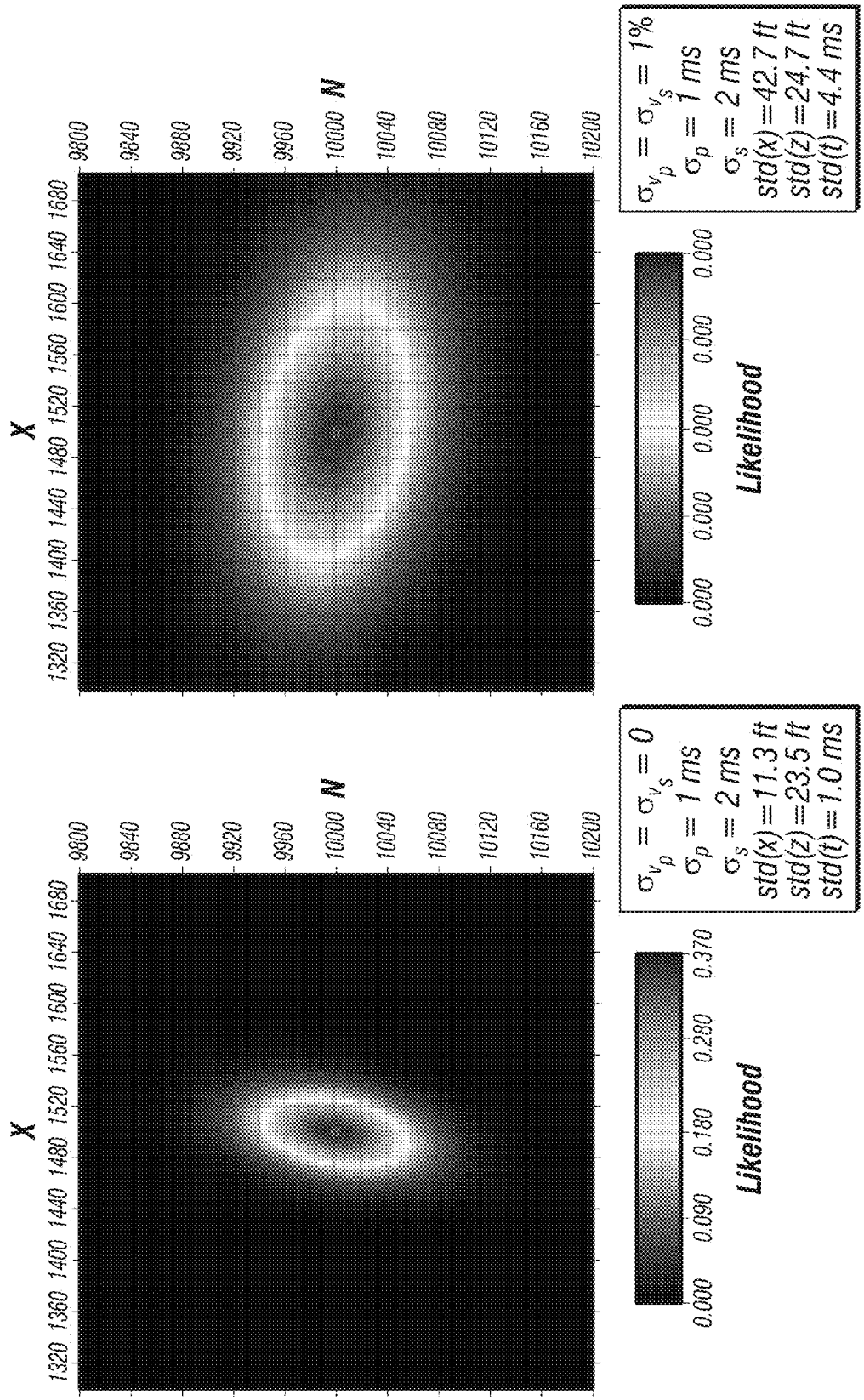
FIGS. 9 and 10 show effects of velocity uncertainty in the downhole case in plot form (FIG. 9) and graph form (FIG. 10), respectively.
Figure 10:
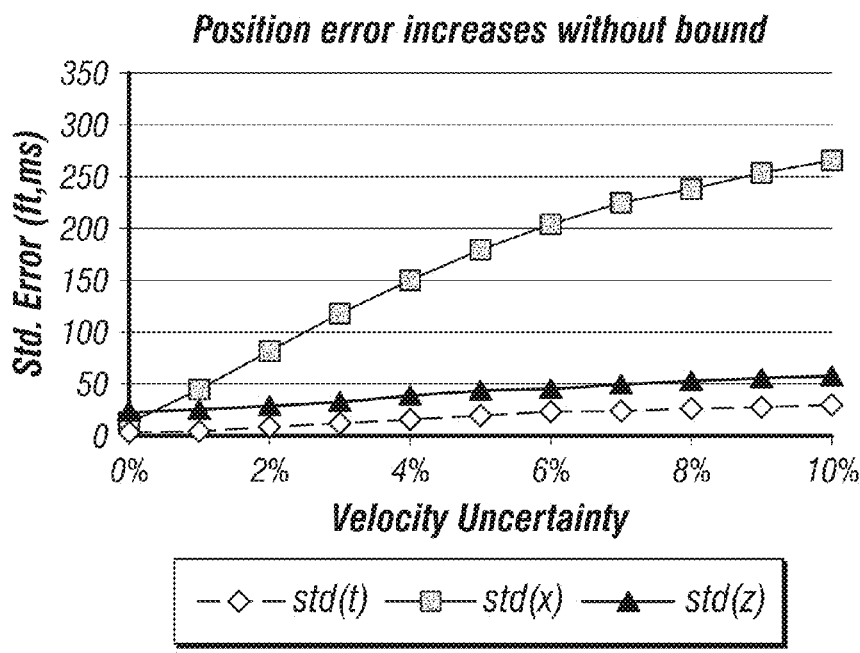

FIG. 9 shows effects of velocity uncertainty on 2D position determination for uncertainty of zero (upper chart) and 1 percent (lower chart) using picked arrival times. FIG. 10 is a graph showing that position determination error is related to velocity uncertainty, and such uncertainty increases without limit.

Figure 11:
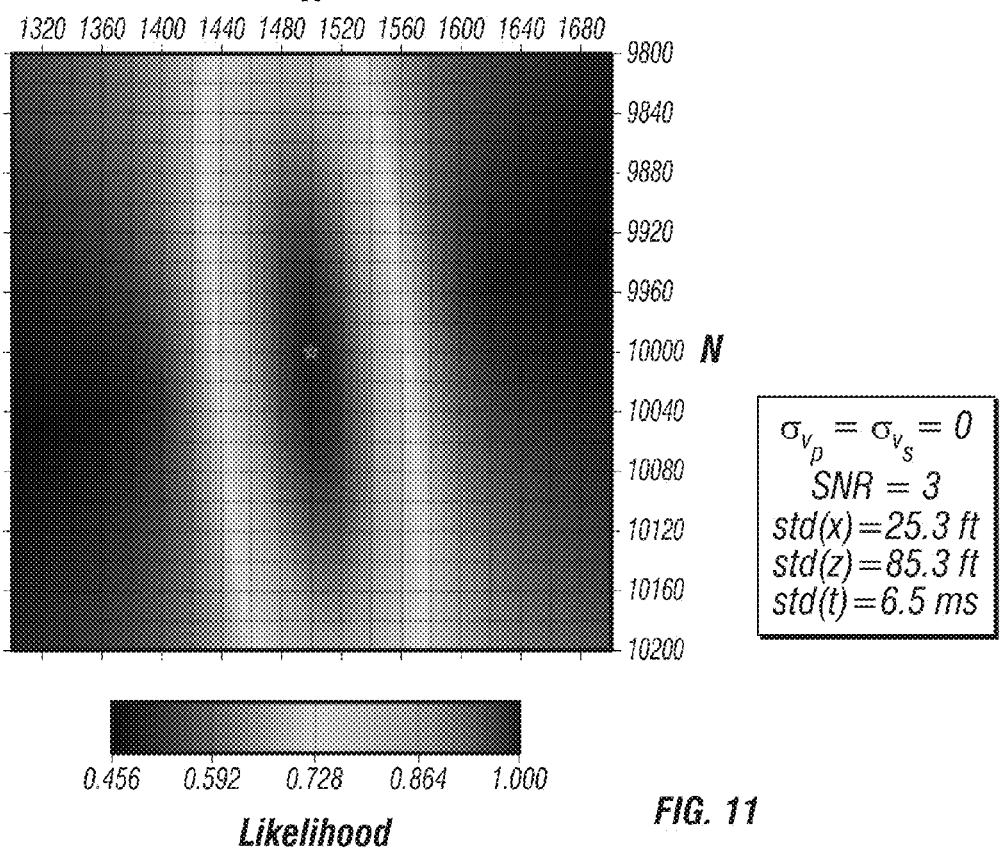
FIGS. 11 and 12 show effects of velocity uncertainty in the surface measurement case in plot form (FIG. 11) and graph form (FIG. 12), respectively.
Figure 12:
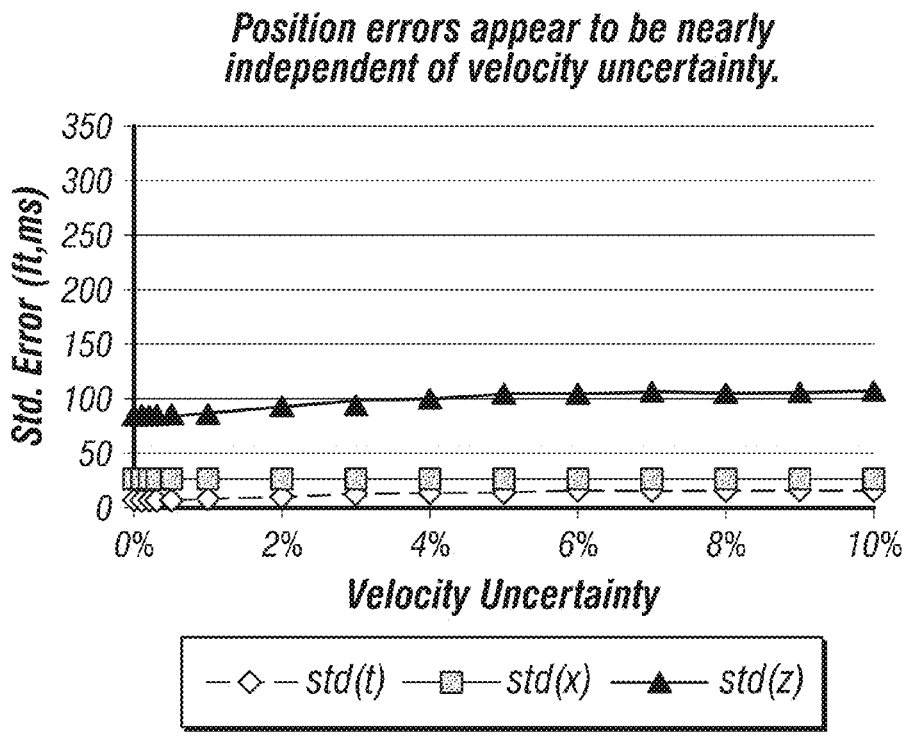

FIGS. 11 and 12 show corresponding results in plot and graph form using beamforming. The results suggest that location error and origin time error is essentially unrelated to velocity uncertainty when beamforming is used.

Figure 13:
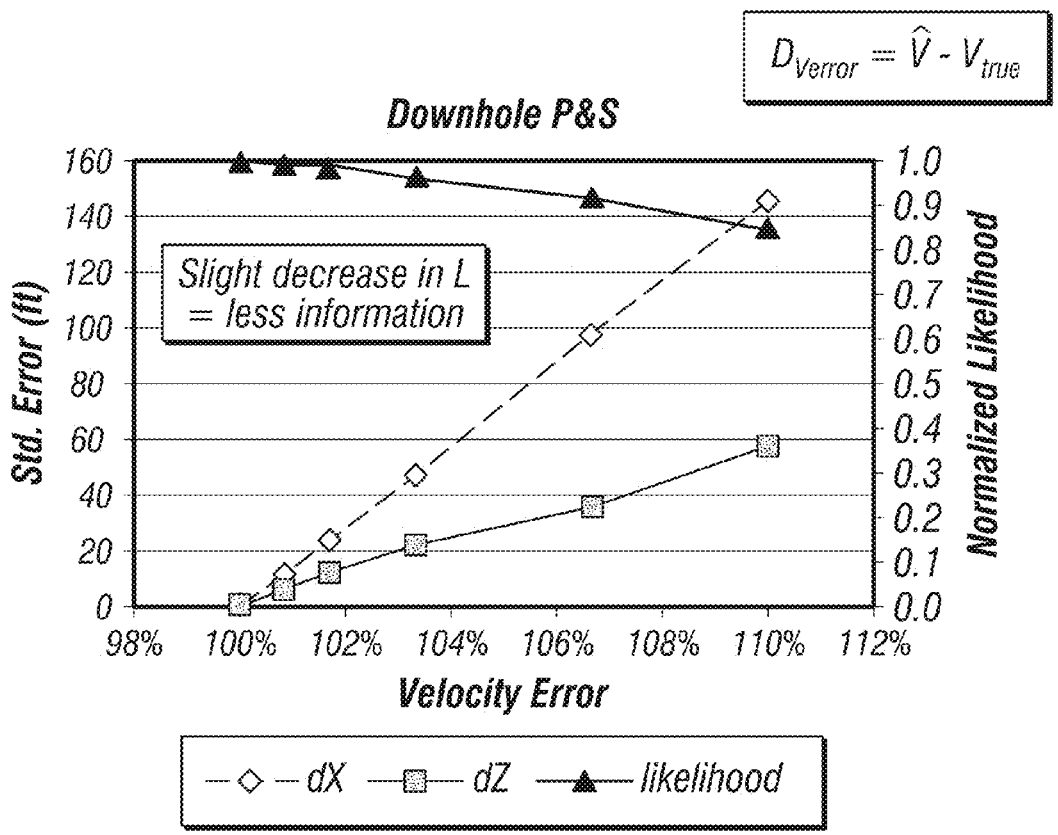
FIGS. 13 and 14 show graphs of the effects of velocity errors in the downhole and surface beamforming case, respectively.
Figure 14:
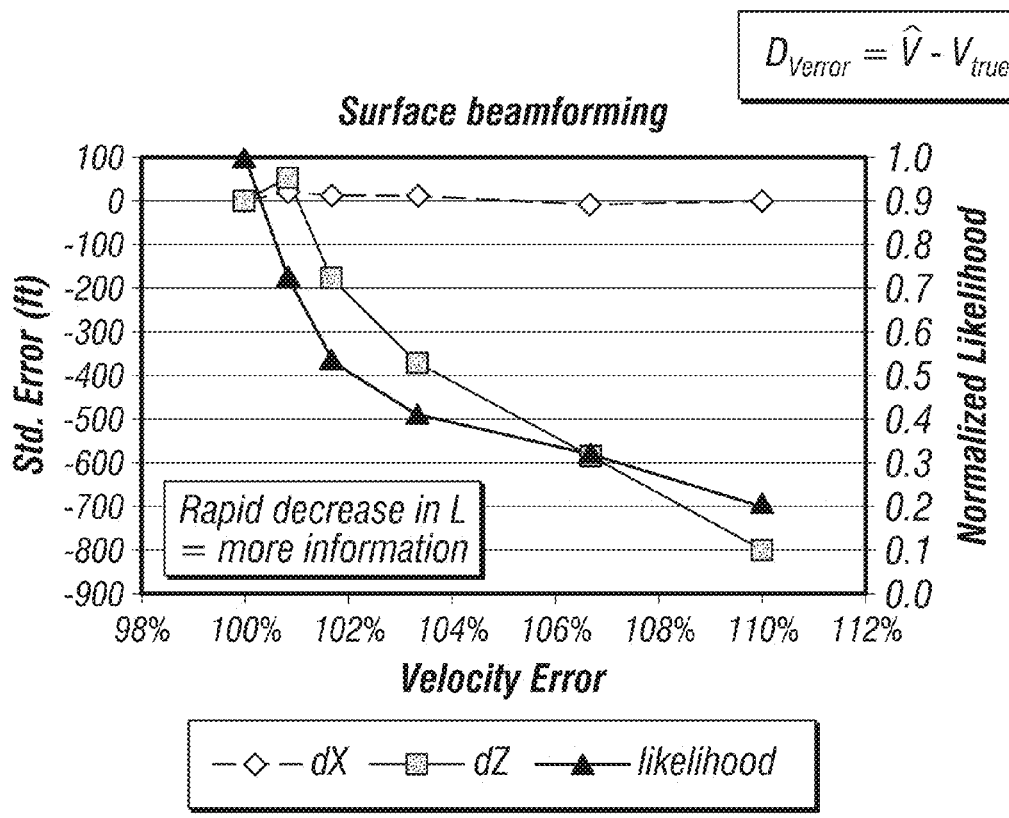

FIGS. 13 and 14, show, respectively, estimated errors in position and origin time determination with respect to velocity error for picked arrival times (FIG. 13) and beamforming (FIG. 14). Position and likelihood appear to be much more sensitive to velocity error using beamforming.

Figure 15:
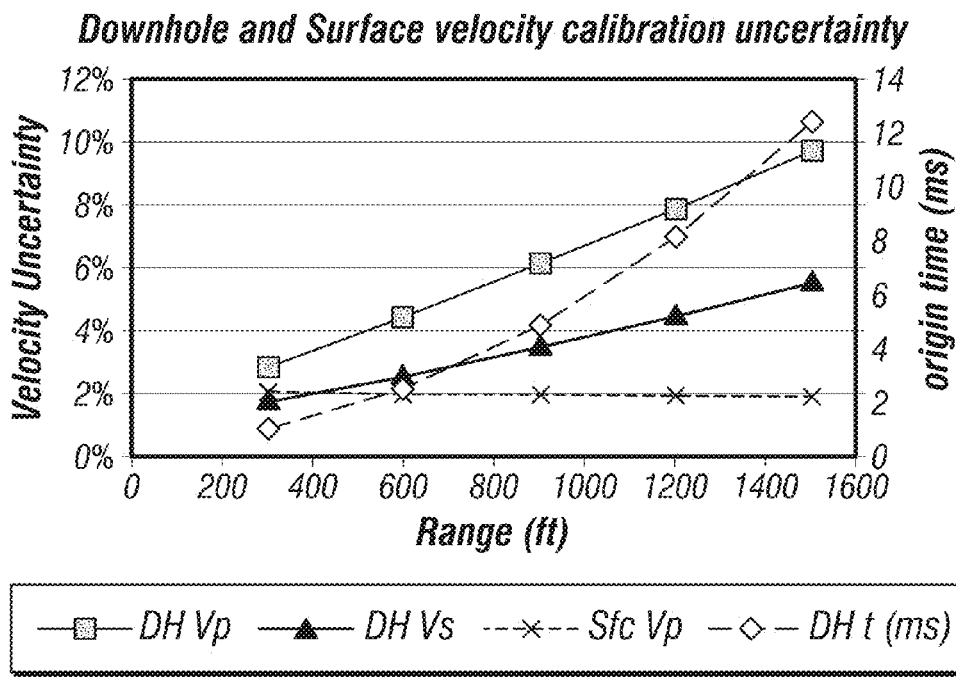
FIG. 15 graphically illustrates the velocity calibration problem.

FIG. 15 is a graph illustrating that even with calibration, such as by taking a "checkshot" at a known depth in a vertical wellbore, the uncertainty in velocity can be quite high. In constructing the graph of FIG. 15, it is assumed that the origin position is known and the parameter vector is modified to include only origin time and P and S velocities: $\xi=[t_0, v_p, v_s]'$. Uncertainty in velocity estimates may be calculated using the Fisher Information Matrix as explained above.

Figure 16:
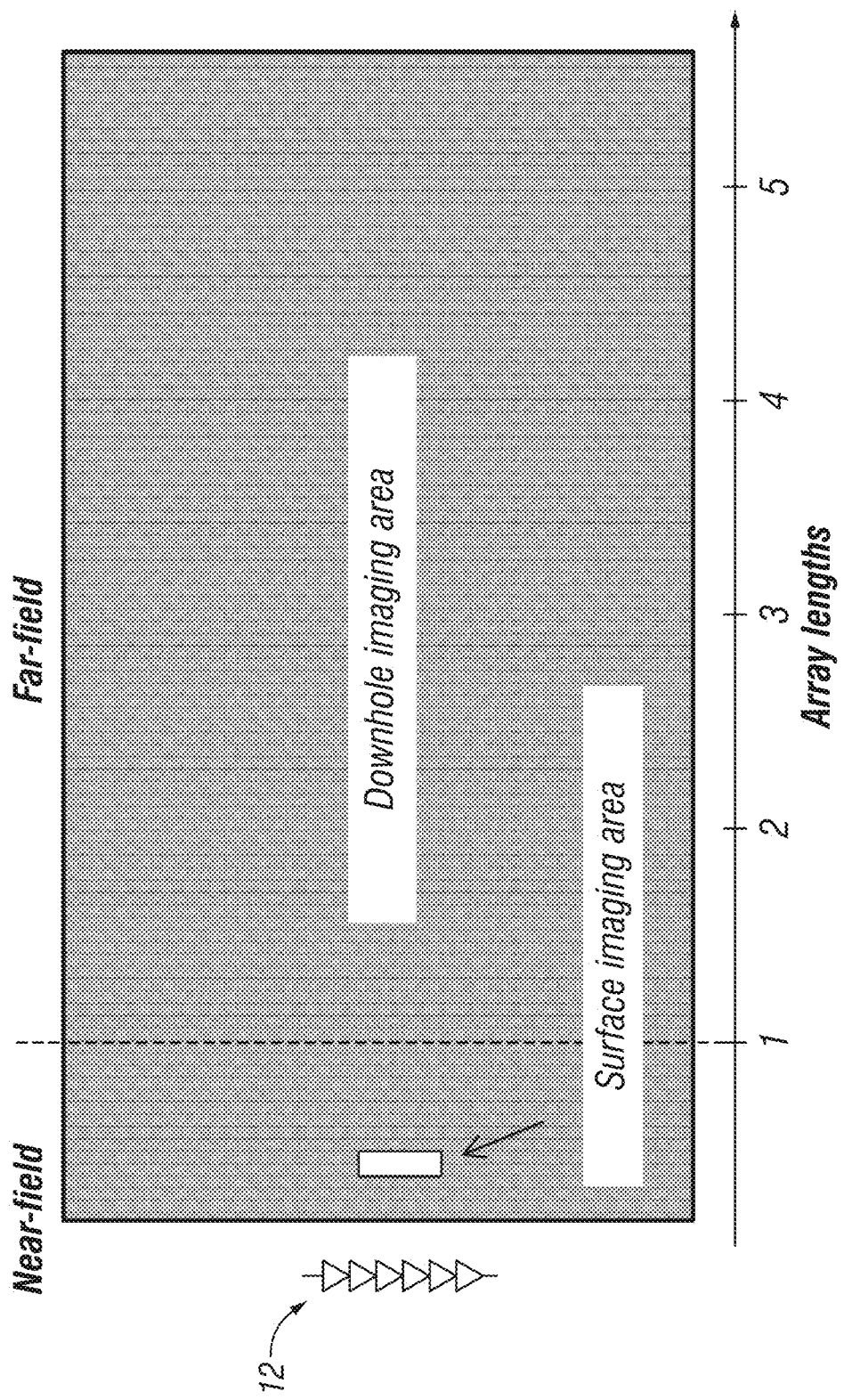
FIG. 16 shows example sensor array geometries.

FIG. 16 shows an example of near field and far field imaging areas given a selected geometry of a sensor 12 array. Imaging using picked arrival times typically spans the near and far-field. Surface imaging target zone typically only includes the near-field.

Figure 17:
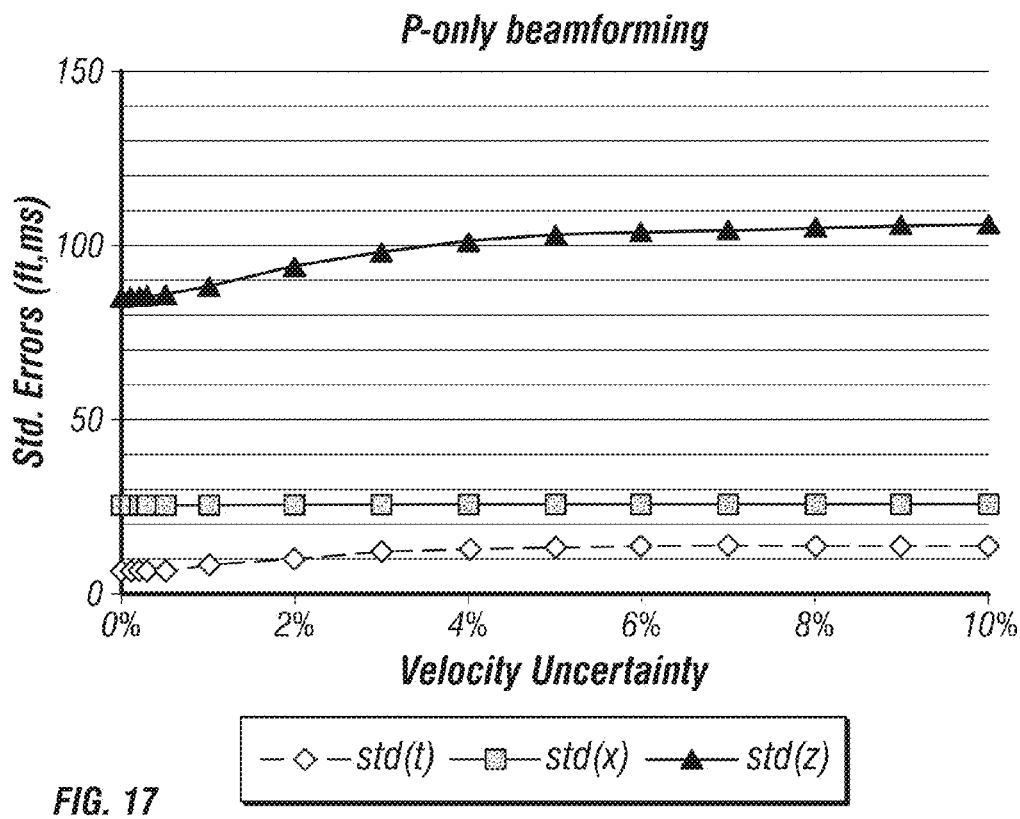
FIGS. 17 and 18 show error as a function of velocity uncertainty between P-only beamforming and P-only arrival picking, respectively, in the near field.
Figure 18:
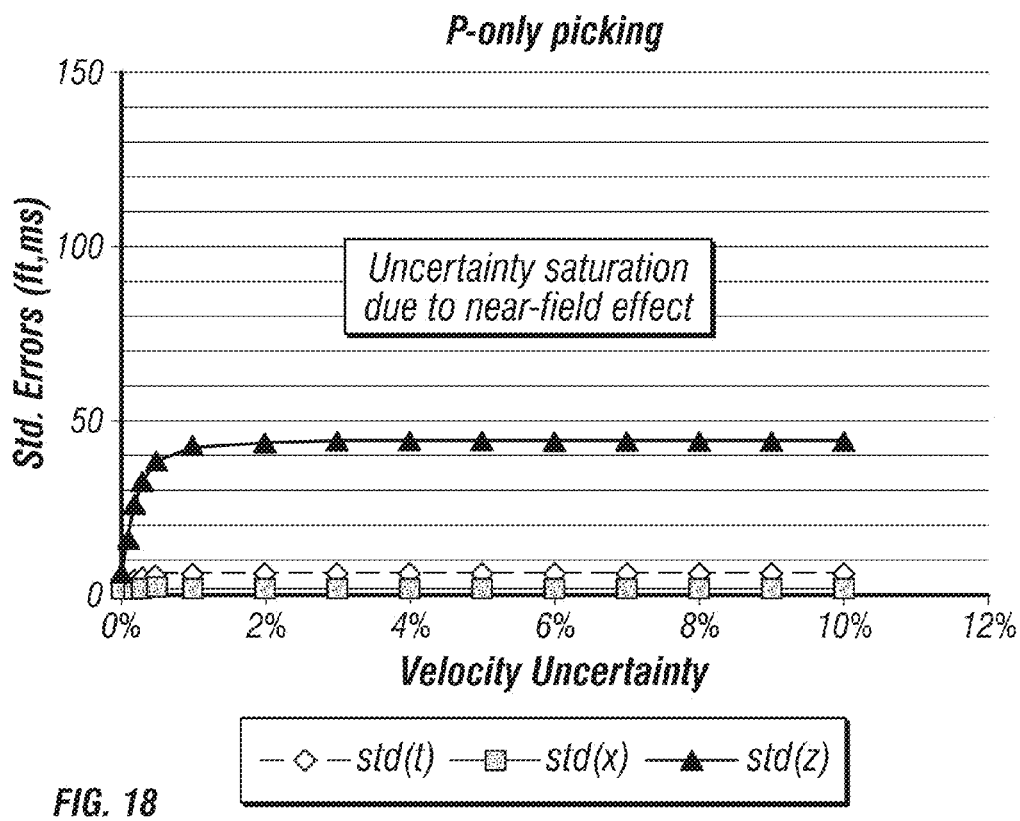

FIGS. 17 and 18 show graphs, respectively, uncertainties in origin position determination with respect to velocity uncertainties using beamforming (FIG. 17) and arrive time selection (picking FIG. 18). For FIGS. 17 and 18, only compressional (P) waves are used.

Figure 19:
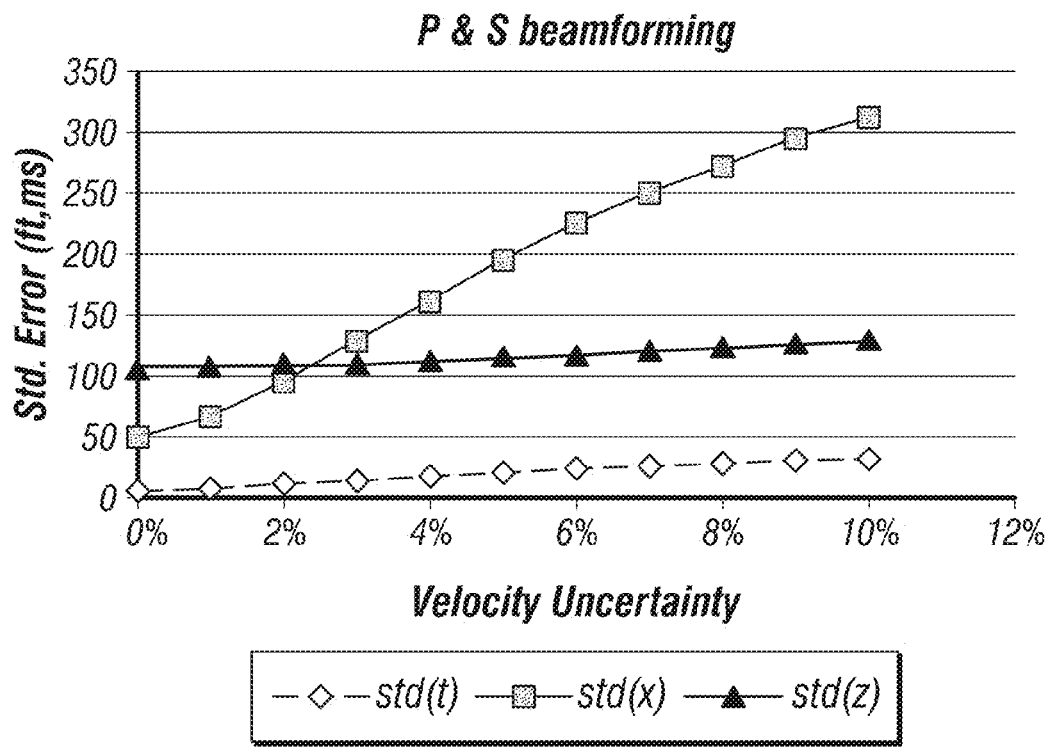
FIGS. 19 and 20 show similar graphs as FIGS. 17 and 18, but for P&S beamforming and picking, respectively.
Figure 20:
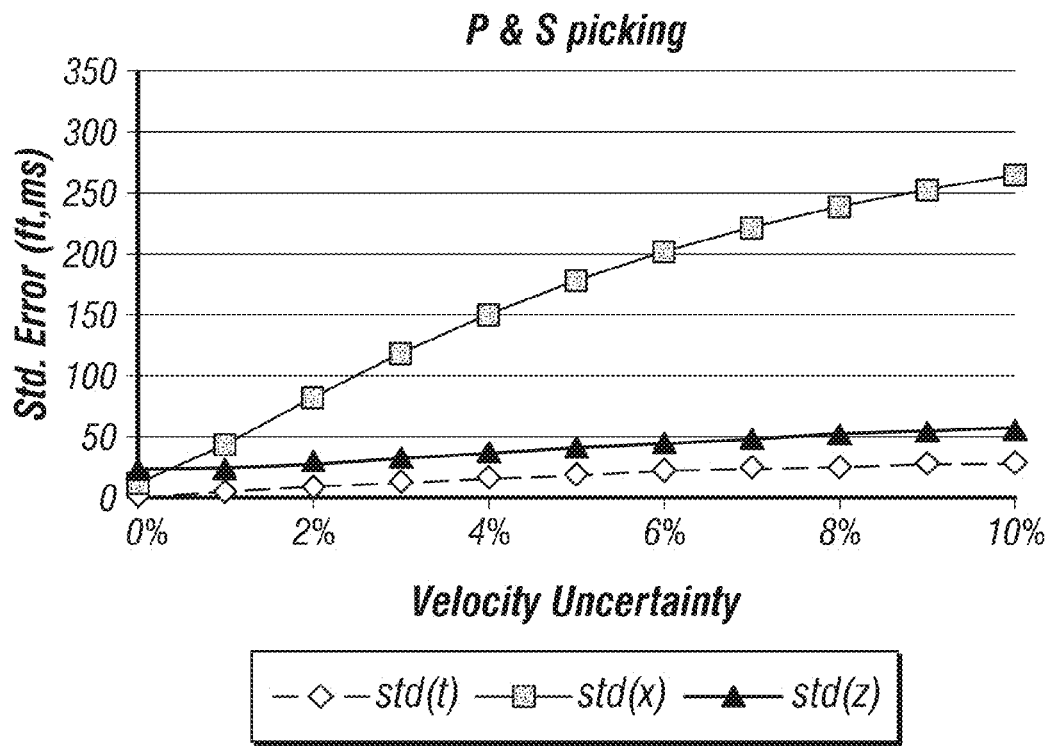

FIGS. 19 and 20 show, respectively, respectively of uncertainties in origin position determination with respect to velocity uncertainties using beamforming (FIG. 19) and arrive time selection (picking FIG. 20). For FIG. and 20, compressional (P) waves and shear waves (S) are used.

Figure 21:
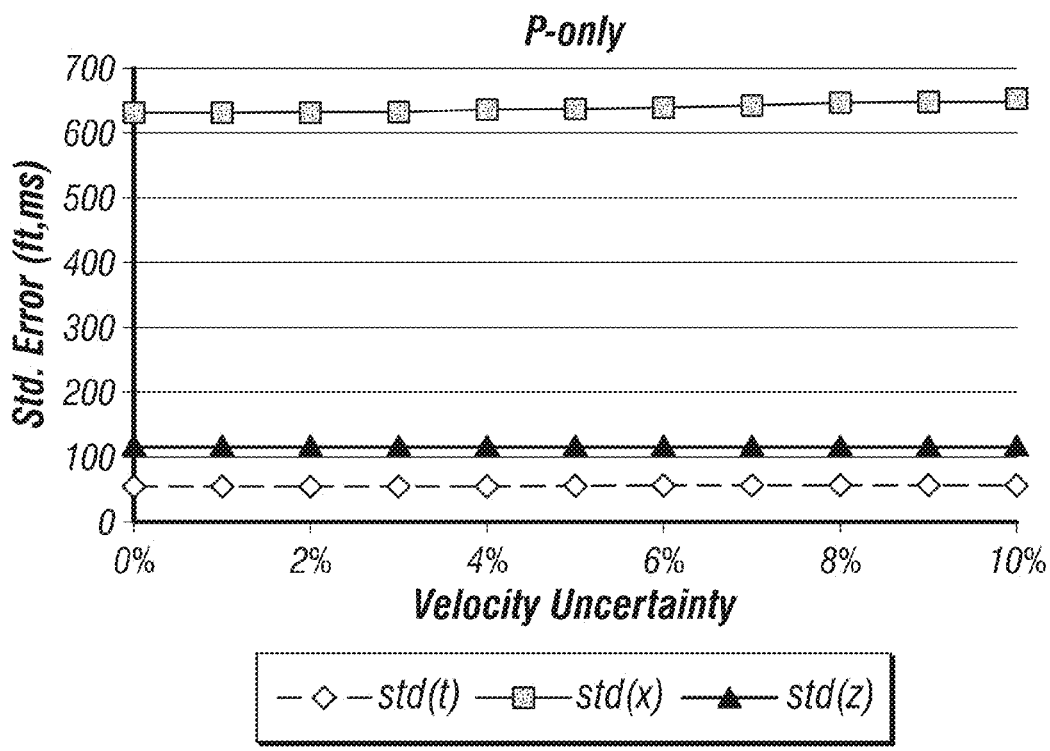
FIGS. 21 and 22 show, respectively, an example of travel time matching error for P only and P&S picks with respect to velocity error.
Figure 22:
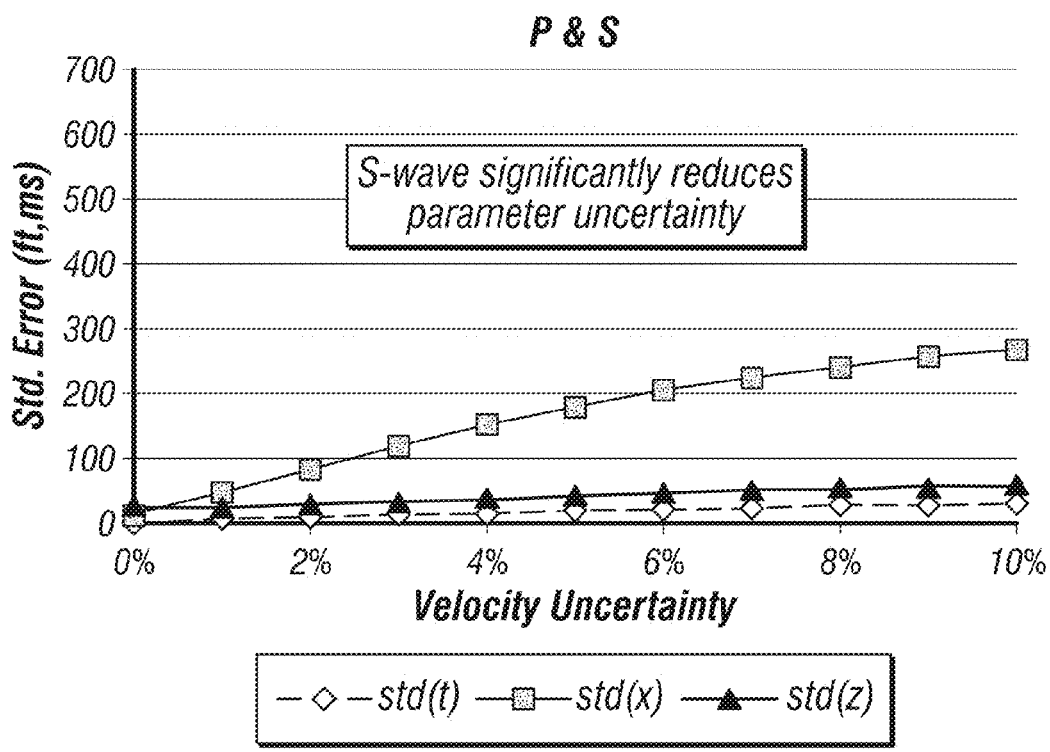
Figure 23:
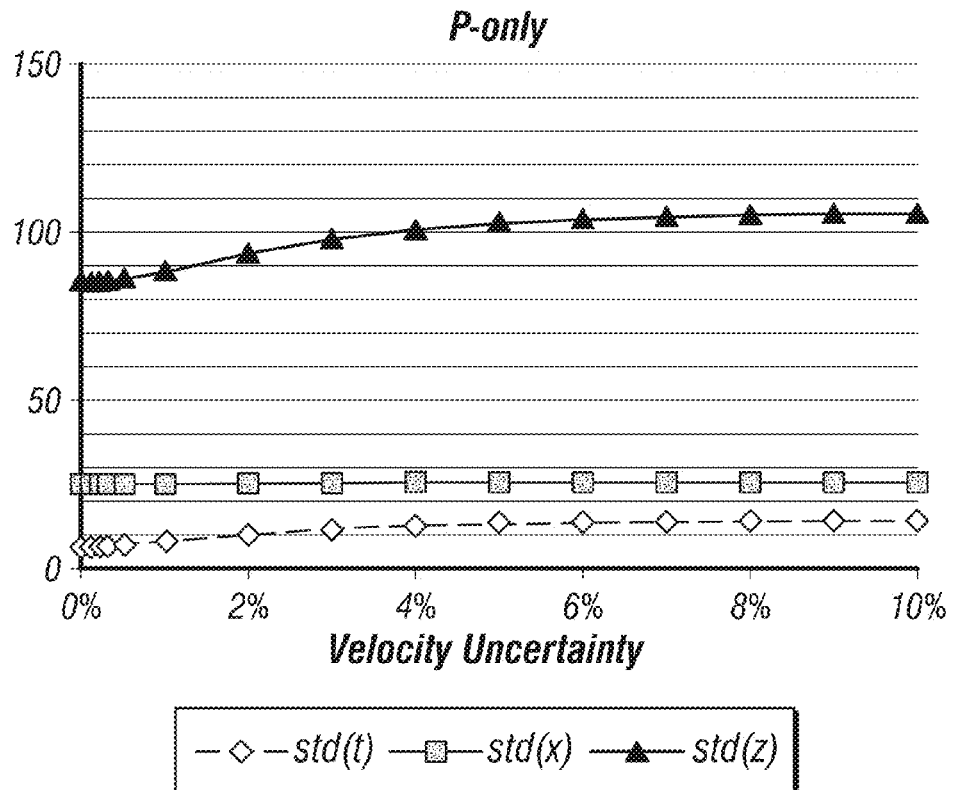
FIGS. 23 and 24 show similar graphs as FIGS. 21 and 22 for the surface array: Using the P&S waves in beamforming with a surface deployed sensor array reduces the uncertainty of the event location under velocity uncertainty, but not so significantly as in the case shown in FIGS. 21 and 22.
Figure 24:
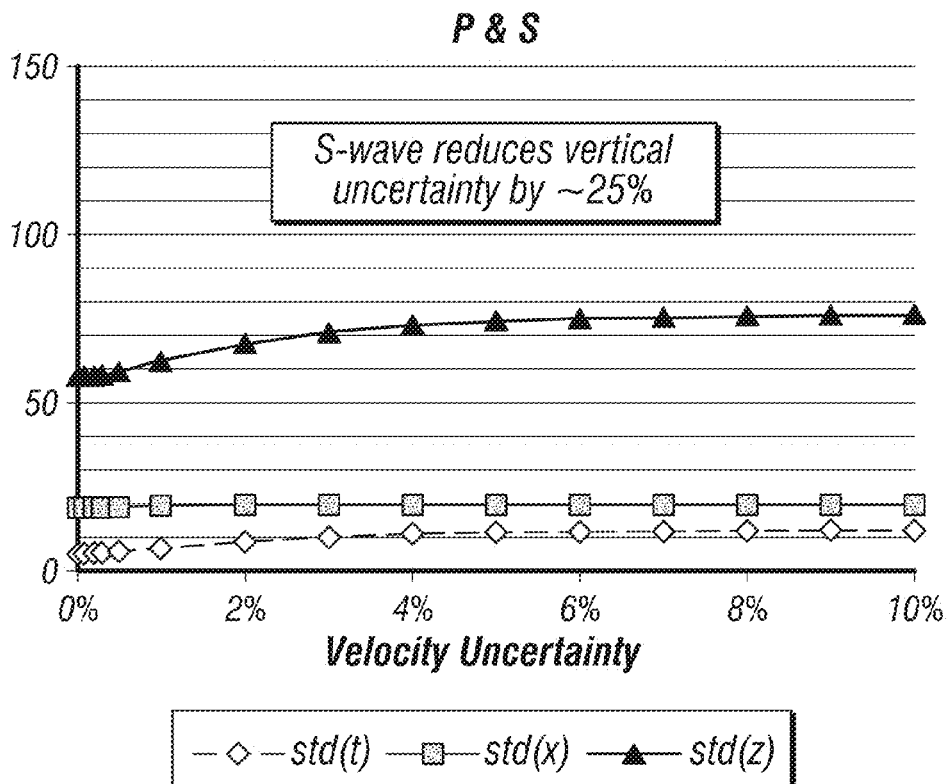

FIGS. 21 and 22 show, respectively how positional uncertainly can be improved substantially using both P&S arrivals (FIG. 22) as compared to using only P arrivals (FIG. 21). FIGS. 23 and 24 show corresponding results for beamforming.

In an example process according to the present disclosure, the variances of the seismic event location estimates made be calculated as follows:

1. Estimate event locations by choosing local peaks in a summed amplitude response from the signals detected by the seismic sensors, wherein the times are adjusted for sensor position and the assumed or estimated seismic velocities. The foregoing may be performed, for example, using amplitude threshold detection.

2. For each peak determined as explained above:
    a) recompute the stacked amplitude response for a selected set of points having small perturbations in time and position from the estimated location(s);
    b) compute second derivatives of a log-likelihood function from the stacked responses at the estimated location(s) and the perturbed locations;
    c) assemble the second derivatives into a Fisher Information Matrix as explained above;
    d) Compute the inverse of the Fisher Information Matrix using standard matrix methods;
    e) take variances of estimated parameters from the elements from the diagonal of the inverted matrix; and
    f) compute standard deviations of the estimated parameters by taking the square root of the variance.

The effect of other uncertainties in the estimation process (e.g., velocity, sensor position, etc.) may be included in the foregoing process. This may be performed by, for example, modeling the additional uncertainty as a probability distribution and extending the log-likelihood function to incorporate it and treating the additional uncertainty as another parameter to be estimated, and computing the uncertainties of the augmented parameter vector as described above including perturbations in the additional parameter(s). Variance estimates of location parameters would then include effects of assumed uncertainties in the new parameters.

It will be appreciated by those skilled in the art that the foregoing process may be applied to the fluid pumping explained with reference to FIG. 1 so as to generate an estimate of positions of seismic events with respect to time as fluid continues to be pumped into the subsurface formation, thus enabling mapping the position of the The following observations have been made with respect to example methods as described above:

Beamforming location uncertainties are determined by shape of the amplitude response and signal to noise ratio (SNR). Position and likelihood much more sensitive to velocity error in the surface array experiment. Velocity uncertainty due to calibration errors can be high. Compressional and shear arrival picking vs. beamforming technique is less important to the results than near-field vs. far-field Adding shear wave picks to near-field imaging only slightly improves location uncertainties. Raypath complexities are likely a significant source of velocity uncertainty.

The following conclusions have been inferred by experimenting using the example techniques described herein. The principal difference in array performance between surface and downhole is due to near-field imaging. In the far-field (downhole array), even with velocity calibration, velocity uncertainty is likely large due to lack of velocity information in the data. Positional uncertainties are greater than what is suggested by travel time errors alone. Events will image with significant location bias when velocity error is large. In the near-field (surface array), more velocity information is available within the data that can be exploited to reduce uncertainties; and events will only image close to the true location when the velocity error is small.

Figure 25:
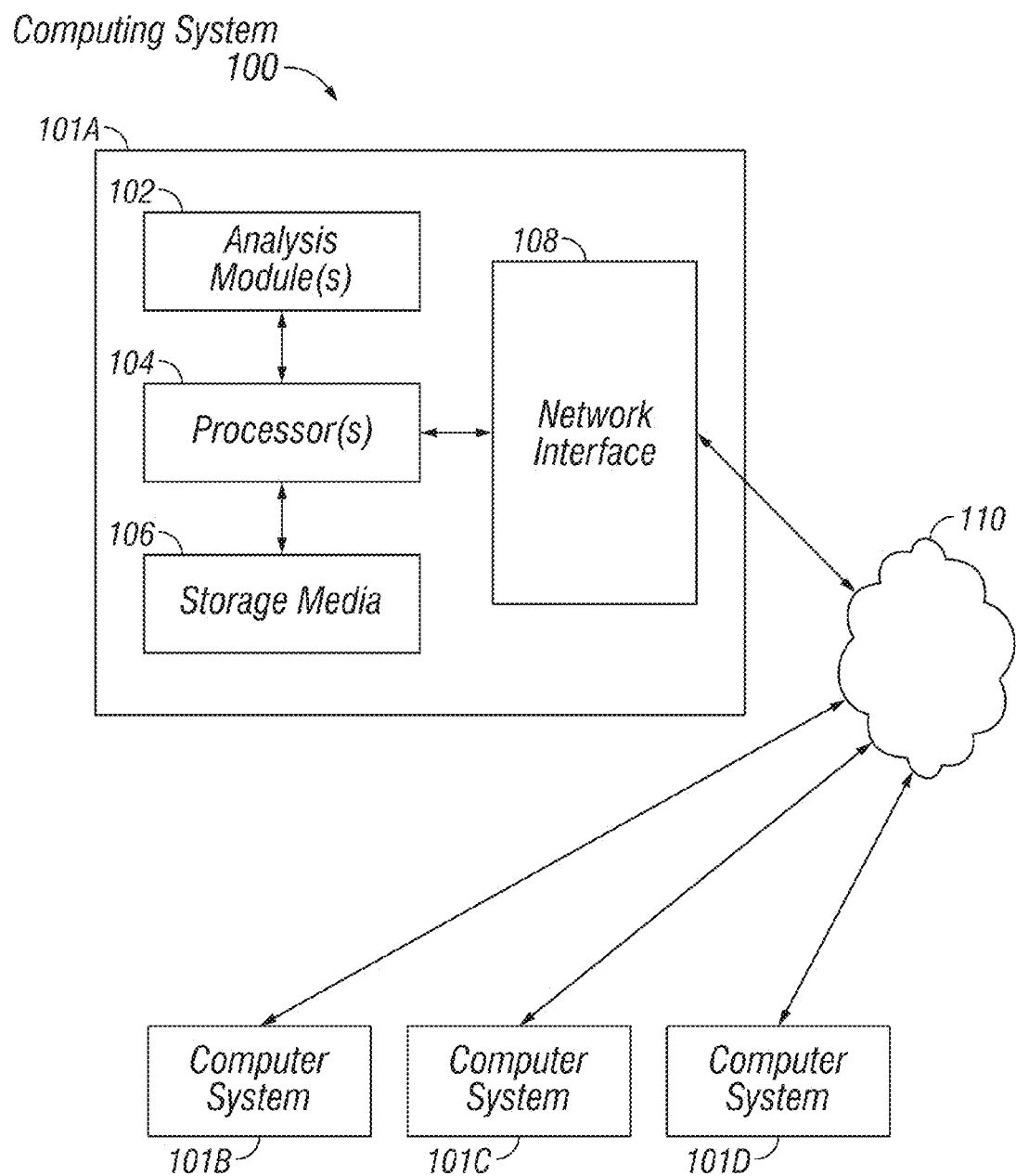
FIG. 25 shows an example computer system that may be used to perform example methods according to the present disclosure.

FIG. 25 shows an example computing system 100 in accordance with some embodiments. The computing system 100 may be an individual computer system 101A or an arrangement of distributed computer systems. The computer system 101A may include one or more analysis modules 102 that may be configured to perform various tasks according to some embodiments, such as the tasks explained above with reference to FIGS. 2A through 24. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, aboard ships, and/or located in varying countries on different continents). One or more of the computer systems may be located in the recording unit (10 in FIG. 1).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the exemplary embodiment of FIG. the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network tier execution.

It should be appreciated that computing system 100 is only one example of a computing system, and that computing system 100 may have more or fewer components than shown, may combine additional components not depicted in the example embodiment of FIG. 25, and/or computing system 100 may have a different configuration or arrangement of the components depicted in FIG. 25. The various components shown in FIG. 25 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Publications used in developing the present example methods include the following:

Abel, J., Coffin, S., Hur, Y., and Taylor, S. (2011) *An analytic model for microseismic event location accuracy*. First Break, 29(10), 99-107.

Eisner, L., Duncan, P., Heigl, W., and Keller, W. (2009). *Uncertainties in passive seismic monitoring*. The Leading Edge, 28(6), 648-655.

Hayles, K., Horine, R., Checkles, S., and Blangy, J. (2011) *Comparison of microseismic results from the Bakken formation processed by three different companies: Integration with surface seismic and pumping data*. SEG Technical Program Expanded Abstracts 2011: pp. 1468-1472.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for estimating uncertainties in determining hypocenters of seismic events occurring in subsurface formations, comprising:
determining estimates of seismic event locations by choosing peaks in summed amplitude of seismic energy detected by an array of sensors disposed proximate an area of the subsurface to be evaluated;
for each peak;
  a) in a computer recomputing the summed amplitude response for a selected set of points comprising perturbations in time and space from the estimated event locations,
  b) in the computer computing second derivatives of a log-likelihood function from the summed amplitude responses at the estimated locations and the perturbed locations,
  c) in the computer assembling the second derivatives into a Fisher information matrix,
  d) in the computer computing an inverse of the Fisher information matrix,
  e) in the computer determining variances of estimated parameters from the elements from the diagonal of the inverted matrix, the estimated parameters comprising at least spatial positions and origin times of each of a plurality of seismic events occurring in the subsurface and a subsurface velocity distribution in the subsurface, and
  f) in the computer computing standard deviations of the estimated parameters by calculating a square root of the variances; and
using the standard deviation of the estimated parameters to estimate a most likely position in space of each of a plurality of seismic events.

2. The method of claim 1 wherein the array of sensors is disposed above the area.

3. The method of claim 1 wherein the array of sensors is disposed in a wellbore proximate the area.

4. The method of claim 1 wherein the peaks are chosen by amplitude threshold detection.

5. The method of claim 1 wherein the seismic events are induced by pumping fluid into a subsurface formation so as to induce fractures in the subsurface formation.

6. The method of claim 5 further comprising continuing to pump fluid into the subsurface formation and repeating the determining peaks, repeating (a) through (f) for subsequent peaks resulting from events caused by continuing to pump fluid and repeating determining estimated parameters and displaying or storing thereof with respect to time.

7. The method of claim 6 further comprising determining in the computer a position of a fluid front in the subsurface formation with respect to time and at least one of storing and displaying the position of the fluid front with respect to time.

8. A non-transitory computer readable medium having thereon a program, the program having logic operable to cause a programmable computer to perform acts comprising:
accepting as input signals detected by an array of sensors disposed proximate an area of subsurface formations to be evaluated;
determining estimates of seismic event locations by choosing peaks in summed amplitude of the signals;
for each peak;
  a) recomputing the summed amplitude response for a selected set of points comprising perturbations in time and space from the estimated event locations,
  b) computing second derivatives of a log-likelihood function from the summed amplitude responses at the estimated locations and the perturbed locations,
  c) assembling the second derivatives into a Fisher information matrix,
  d) computing an inverse of the Fisher information matrix,
  e) determining variances of estimated parameters from the elements from the diagonal of the inverted matrix, and
  f) computing standard deviations of the estimated parameters by calculating a square root of the variances, the estimated parameters comprising at least spatial positions and origin times of each of a plurality of seismic events occurring in the subsurface and velocity distribution in the subsurface; and
using the standard deviation of the estimated parameters to estimate a most likely position in space of each of a plurality of seismic events.

9. The non-transitory computer readable medium of claim 8 wherein the array of sensors is disposed above the area.

10. The non-transitory computer readable medium of claim 8 wherein the array of sensors is disposed in a wellbore proximate the area.

11. The non-transitory computer readable medium of claim 8 wherein the peaks are chosen by amplitude threshold detection.

12. The non-transitory computer readable medium of claim 8 wherein the seismic events are induced by pumping fluid into a subsurface formation so as to induce fractures in the subsurface formation.

13. The non-transitory computer readable medium of claim 12 further comprising continuing to pump fluid into the subsurface formation and repeating the determining peaks, repeating (a) through (f) for subsequent peaks resulting from events caused by continuing to pump fluid and repeating determining estimated parameters and displaying or storing thereof with respect to time.

14. The non-transitory computer readable medium of claim 13 further comprising determining in the computer a position of a fluid front in the subsurface formation with respect to time and at least one of storing and displaying the position of the fluid front with respect to time.

* * * * *